(12) United States Patent
Lazarski

(10) Patent No.: US 10,147,304 B1
(45) Date of Patent: Dec. 4, 2018

(54) HANDHELD EMERGENCY COMMUNICATIONS AND LOCATION INFORMATION SYSTEMS

(71) Applicant: Beth Lazarski, Wappingers Falls, NY (US)

(72) Inventor: Beth Lazarski, Wappingers Falls, NY (US)

(*) Notice: Subject to any disclaimer, the term of this patent is extended or adjusted under 35 U.S.C. 154(b) by 0 days.

(21) Appl. No.: 15/650,793

(22) Filed: Jul. 14, 2017

(51) Int. Cl.
| G08B 25/00 | (2006.01) |
| G06F 17/30 | (2006.01) |
| G08B 25/01 | (2006.01) |
| G08B 21/02 | (2006.01) |
| G08B 25/14 | (2006.01) |

(52) U.S. Cl.
CPC ..... *G08B 25/014* (2013.01); *G06F 17/30029* (2013.01); *G08B 21/0269* (2013.01); *G08B 25/14* (2013.01)

(58) Field of Classification Search
None
See application file for complete search history.

(56) References Cited

U.S. PATENT DOCUMENTS

| 7,409,044 | B2 * | 8/2008 | Leduc | G06Q 20/105 |
| | | | | 379/106.02 |
| 8,461,983 | B2 * | 6/2013 | McCauley | G08B 25/016 |
| | | | | 340/539.1 |
| 9,794,755 | B1 * | 10/2017 | South | H04W 4/04 |
| 2009/0013719 | A1 * | 1/2009 | Loving | A44C 15/003 |
| | | | | 63/1.12 |
| 2011/0160547 | A1 * | 6/2011 | Yang | A61B 5/0002 |
| | | | | 600/301 |
| 2013/0134268 | A1 * | 5/2013 | Wessells | F16B 17/00 |
| | | | | 248/125.8 |
| 2014/0088620 | A1 * | 3/2014 | Tobias | A61B 17/083 |
| | | | | 606/151 |
| 2014/0247124 | A1 * | 9/2014 | Ros | G08B 15/004 |
| | | | | 340/539.11 |
| 2017/0215033 | A1 * | 7/2017 | Piraino | H04W 4/02 |
| 2017/0230786 | A1 * | 8/2017 | Ramamurthy | H04W 4/90 |
| 2017/0245130 | A1 * | 8/2017 | Mehta | H04W 4/90 |
| 2017/0289350 | A1 * | 10/2017 | Philbin | H04M 3/5116 |
| 2018/0025619 | A1 * | 1/2018 | Mattiaccio, III | G08B 25/009 |
| 2018/0054713 | A1 * | 2/2018 | South | H04W 4/90 |

* cited by examiner

*Primary Examiner* — Fekadeselassie Girma
(74) *Attorney, Agent, or Firm* — Integrity Patent Group, PLC; Charles E. Runyan

(57) ABSTRACT

A handheld emergency communications and location information system for providing a user with a compact portable handheld product that provides personnel security. The product provides quick informative access to remote authorities that may help address many different emergencies. The handheld emergency communications and location information system includes a base unit assembly. The base unit assembly includes a self-contained enclosure made up of a front plate, a rear plate, and an inner volume. The inner volume contains a wireless transmitter and receiver unit, a speaker and alarm unit, a microcontroller, a memory unit, and a power source. User accessible components include three raised emergency signal buttons, a reset/test button, two indicator lights, and an object-connector.

13 Claims, 14 Drawing Sheets

HANDHELD EMERGENCY COMMUNICATIONS AND LOCATION INFORMATION SYSTEMS

CROSS-REFERENCE TO RELATED APPLICATIONS

The present application is related to and claims priority from prior provisional application Ser. No. 62/089,166, filed Dec. 8, 2014, and pending non-provisional application Ser. No. 14/820,614, filed Aug. 7, 2015, which applications are incorporated herein by reference.

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of emergency communication devices and more specifically relates to a handheld emergency communications and location information system.

2. Description of Related Art

Personal security is valued by young and old alike. Unfortunately, injuries, burglaries, health issues, and other emergencies occur unexpectedly in a person's life. Everyone desires the feeling of security whether in their homes or outside in unpredictable environments. Unfortunately, unpredictable circumstances occur throughout a person's life, especially when traveling or otherwise away from home. Many individuals living in apartments or condos are not allowed to install home security systems and have no readily available way to call the police for emergency assistance. Others cannot afford to install security systems where they live, and also have no immediate means of contacting appropriate authority when traveling outside their homes. This fear of unexpected harm to one's person often increases as an individual age or becomes involved in relatively dangerous activities.

The risk of personal injury due to health problems and personal injury especially increase when traveling and in more vulnerable situations. Cell phones are often used today to contact emergency personnel by calling 911. Time is extremely valuable when being attacked, and attempting to place a phone call may place a victim in more danger. In order to provide themselves with more timely security, many people rely on carrying deadly weapons for self-defense. For many people, who are untrained or not comfortable with weapons, wielding a weapon is not a reasonable option.

Too often, women, seniors, and children are victimized because they are perceived as being defenseless. Generally, they represent a more vulnerable population to predators, thieves, and other scofflaws and as such need viable options to protect themselves. Numerous cases of children kidnappings and abuses occur daily without the victim contacting the appropriate authorities in a timely manner. This is not desirable.

In emergency situations, many people resort to calling 911 for help. When calling 911 to respond to emergencies, callers must wait on the line to reach an operator to describe the emergency. During this process, precious minutes are lost before emergency personnel arrive. Seniors are encouraged to have medical alert systems, making it easy to summon help while they are in their homes, but these systems may not provide coverage when users are away from home. Many seniors and children find the use of mobile phones too complex. Those without home phones or mobile phones, have no reliable way to contact 911 when assistance is needed. Thus, a more convenient, portable, and less complex device is needed to provide personal security to all product owners.

Several attempts have been made to solve the above-mentioned problems such as those found in U.S. Publication. No. 2014/0247124 to Jacqueline V. Ros; U.S. Pat. No. 8,461,983 to Michele McCauley; and U.S. Pat. No. 7,409,044 to Michel Leduc. This art is representative of personal tracking, security, and alarm devices. However, none of the above inventions and patents, taken either singly or in combination, is seen to describe the invention as claimed.

Preferably, a handheld emergency communications and location information system should provide a safe and reliable means for communicating an emergency condition and, yet would operate reliably and be manufactured at a modest expense. Thus, a need exists for a reliable handheld emergency communications and location information system to avoid the above-mentioned problems.

BRIEF SUMMARY OF THE INVENTION

In view of the foregoing disadvantages inherent in the known emergency communication device art, the present invention provides a novel handheld emergency communications and location information system. The general purpose of the present invention, which will be described subsequently in greater detail, is to provide a user-friendly, easily accessible device worn by a user that provides personal security via information communications with a remote security provider. The present invention may use a cellular telecommunication network for transmitting a signal for communications to the remote security provider. The present invention may also receive a GPS signal that may relay information pertinent to the location of the user to the remote security provider, when activated by the user.

A handheld emergency communications and location information system is disclosed herein in various embodiments; a first embodiment comprising a base unit assembly comprising a self-contained enclosure comprising a front plate and a rear plate being an encasement for an inner volume. Located within the inner volume, a plurality of components may provide the concealed functional capabilities of the primary embodiment of the present invention. The inner volume may comprise at least one wireless transmitter and receiver unit, at least one speaker and alarm unit, a microcontroller, at least one memory unit, and at least one power source.

The user accessible exterior of the first embodiment of the present invention may comprise a plurality of raised emergency signal buttons, a plurality of non-emergency control buttons, a first indicator light, a second indicator light, and at least one object-connector. The plurality of emergency signal buttons may be accessible from the front of the current invention, and may protrude outwards relative to the front plate.

During an emergency, a means to easily activate one of the plurality of emergency signal buttons may be desirable in order for the emergency signal to be relayed to the remote security provider. The protrusion of the plurality of emergency signal buttons may provide easy accessibility for the user. Another advantage of the current embodiment is that the device, when on, does not continuously signal the current user position to a remote monitoring station. Continuously sending wireless signals may quickly drain battery power of any device. Instead, the present invention begins location communication with a remote monitoring station upon application of one of the plurality of emergency signal buttons, thus saving battery power and extending use.

The base unit assembly of the current invention comprises a self-contained enclosure. The base unit assembly of the portable handheld emergency communications and location information system may be transported on the body of a user via an object-connector. The self-contained enclosure may comprise at least one wireless transmitter and receiver unit, at least one speaker and alarm unit, the microcontroller, at least one memory unit, at least one power source, the plurality of raised emergency signal buttons, the plurality of non-emergency control buttons, the first indicator light, the second indicator light, and at least one object-connector.

The front plate, rear plate, and inner volume structurally define the parameters of the self-contained enclosure. Within the inner volume of the self-contained enclosure the wireless transmitter(s) and receiver unit(s), the speaker(s) and alarm unit(s), microcontroller, memory unit(s), power source(s) are securely mounted. The microcontroller may be in communication with the wireless transmitter(s) and receiver unit(s), the speaker(s) and alarm unit(s), the memory unit(s), the raised emergency signal buttons, the non-emergency control buttons, the first indicator light, and the second indicator light. The microcontroller may function as the computer and controller of the aforementioned listed components. The power source(s) provides electrical power to the wireless transmitter(s) and receiver unit(s), the speaker(s) and alarm unit(s), the microcontroller, the memory unit(s), the first indicator light, and the second indicator light. The power source may receive electricity via an external connection/power plug.

The wireless transmitter and receiver unit may be useful for wirelessly communicating a signal to another communication device which is remotely located in respect to the user's location. The remote security provider may be located anywhere there is access to appropriate cell-phone towers and other necessary communication means. The remote security provider may further provide integrated access and quick communications with several different public and private emergency and security personnel providers. The receiver unit may receive a response signal sent from a remote location in order to initiate further functions. The aforementioned functions may include initiating the first indicator light in order to alert the user that the appropriate security personnel have received the distress signal. Furthermore, the functions may initiate the second indicator light in order to alert the user that the appropriate security personnel are en-route to their location.

The speaker(s) and alarm unit(s) may alert local persons of an emergency by emitting audible sounds. The alert sounds may vary and may be designed to necessitate a reaction from persons nearby. The memory unit may be useful for storing data files containing information needed for operating the base unit assembly. The plurality of raised emergency signal buttons are located on a plane above the front plate of the self-contained enclosure such that visually impaired and non-visually impaired users alike can manipulate the raised emergency signal buttons effectively and accurately.

A second embodiment comprising a pendant and a third embodiment comprising a watch are also envisioned herein. Future models may also comprise a fitness training device capable of tracking a user's motion.

The present invention holds significant improvements and serves as a handheld emergency communications and location information system. For purposes of summarizing the invention, certain aspects, advantages, and novel features of the invention have been described herein. It is to be understood that not necessarily all such advantages may be achieved in accordance with any one embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, handheld emergency communications and location information system, constructed and operative according to the teachings of the present invention.

The various embodiments of the present invention will hereinafter be described in conjunction with the appended drawings, wherein like designations denote like elements.

DETAILED DESCRIPTION

Figure 1A:
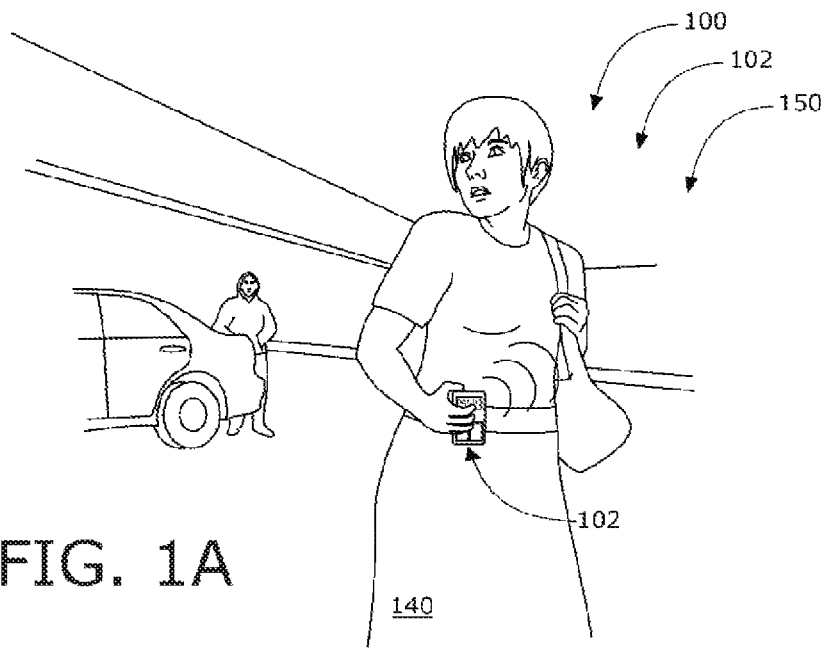
FIG. 1A shows a perspective view illustrating a handheld emergency communications and location information system during an 'in-use' condition showing a user signaling an emergency according to an embodiment of the present invention.

As discussed above, embodiments of the present invention relate to a handheld emergency communications and location information system and more particularly to a safe and reliable means for communicating an emergency condition as used to improve personal security and emergency response times for a user, with extended protection against a multitude of potential emergencies in a multitude of different locations.

Generally speaking, as discussed above, embodiments of the present invention relate to a security device and more particularly to a handheld emergency communications and location information system. The handheld emergency communications and location information system may be designed to provide potential victims a way to communicate with others when they are threatened or in need of assistance.

The present invention may be designed to be used easily and safely by a multitude of users, such as vulnerable children, seniors, women, and many other such persons. The use of the present invention is designed to be user-friendly such that a large percentage of the population could feasibly use the device without needing directions. The raised emergency signal buttons may provide easy use by visually impaired users as well.

The present invention may be of compact design in order to provide a function-able attachment to a key chain or as a device capable of being clipped to a belt, pocket, or other article of clothing in order to provide easy user accessibility. The present invention may comprise three hand activated buttons that may be activated by depressing the buttons.

A first red button of the raised emergency signal buttons may be provided and labeled with a large 911 and may be pushed for general emergencies. An alarm may be provided so others nearby are made aware of the emergency situation occurring and potentially come to the user's aid. When the present invention is turned on, a GPS tracking system is activated automatically via a wireless transmitter and receiver unit, so the victim can be located quickly or followed if he or she is abducted or lost. The present invention may also function as a mobile phone capable of two-way communications between the victim and emergency personnel via a built-in microphone and speaker.

The device may comprise a second blue button (of the raised emergency signal buttons) comprising a red cross. When activated the second blue button may notify a remote emergency provider of the user's medical emergency. When the blue button is depressed it may work in the same manner as the red 911 button. An audible alarm may be sounded as well as an activation of the GPS system and two-way communications enabled. The second blue button's variation in function may be that the information received by 911 personnel may be pertinent to a medical emergency. Medical emergency information may be communicated by the present invention such that an ambulance or other medical emergency providers may be informed with very limited time delay.

The present invention may comprise a third white button (of the raised emergency signal buttons) functioning as a panic button. The third white button may be activated by a user in cases such as an ambush or forced emergencies. When the third white button is activated no audible alarm or two-way emergency mobile phone communications may be activated. Furthermore, when the white button is applied the GPS tracking system may be activated, and a silent signal communication may be sent. The silent signal may be relayed to the police, or alternatively a remote security provider. Furthermore, the silent signal may communicate a need for immediate assistance without the attacker having knowledge that the authorities have been notified.

Located towards the top of the device, two indicator lights may be provided. The first indicator light may be red, which indicates a signal has been sent from the victim. The second indicator light may be blue, indicating that the appropriate emergency authorities have been dispatched to their current location. This may reassure a user under distress of injury or otherwise in fear for their well being, which may play a pivotal role in reducing stress and helping a user to remain calm. This reassurance may be most beneficial to those persons more prone to reacting poorly to stressful situations, such as the elderly, and relatively more vulnerable persons.

The present invention may also provide a non-emergency control button embodied as a small reset/test button on the front side of the base unit assembly. A unique serial number may be provided with the present invention, which may specifically reference a user's profile and account information (kept effectively confidential). Vital-information about the owner may be available to emergency personnel, and integrally updated via the remote emergency personnel.

Alternatively, vital-information may be updated via a website where a user or other authorized persons may input a user's most current medical, physical, and other pertinent information. The vital-information may include a photo, a generalized description, the age, the height, the weight, and emergency contacts of the user.

When the general and medical emergency buttons are applied, 911 services may have access to the vital-information of the user. Alternate models of the present invention may be worn as a watch, a necklace, or a bracelet. These may include a camera, which may be activated to capture a picture of a perpetrator which may be relayed to the proper authorities, such as local police. Further future models envisioned may be the present invention capable of use in conjunction with home protection systems. It is conceived that a future model of the present invention may provide a user with the ability to arm and disarm a home security system without needing access to the keypad inside their home, thus providing security controls while away from home. Future models may also comprise a fitness training device capable of tracking a user's motion.

The unique features of the present invention may provide the following benefits for all consumers: a personal security device that will notify police and medical emergency personnel when assistance is needed; a medical alert system that may provide emergency safety coverage when away from home; a simple to operate device useful for children, adults, and seniors alike; a compatible device for visually impaired users with raised buttons and braille so that visually impaired users may differentiate the appropriate button to apply; access to an emergency service provider, such as 911 personnel for those users without access to a mobile phone; a water resistant device; a device upon application of an emergency button that may continually relay a signal to remote emergency personnel until a response signal is provided; an indicator light providing the user with real time confirmation of the status of the emergency; a device upon application of an emergency button that may activate an audible alarm sound; an attachment means for a user via a belt clip or a quick release key chain; a means to track a user's location via GPS location in order to provide needed assistance to users during ongoing crimes; and a device to provide piece of mind for users on the go.

Referring now to drawings by numerals of reference there may be shown in FIGS. 1A-9 various views of handheld emergency communications and location information system 100 which may comprise base unit assembly 102, wireless transmitter and receiver unit 436, speaker and alarm unit, microcontroller 440, memory unit 442, power source 444, a plurality of raised emergency signal buttons 202, a plurality of non-emergency control buttons 204, first indicator light 208, second indicator light 210, and object-connector 215. Base unit assembly 102 may comprise self-contained enclosure 220. Self-contained enclosure 220 may include front plate 222, rear plate 324, and inner volume 426.

Figure 1B:
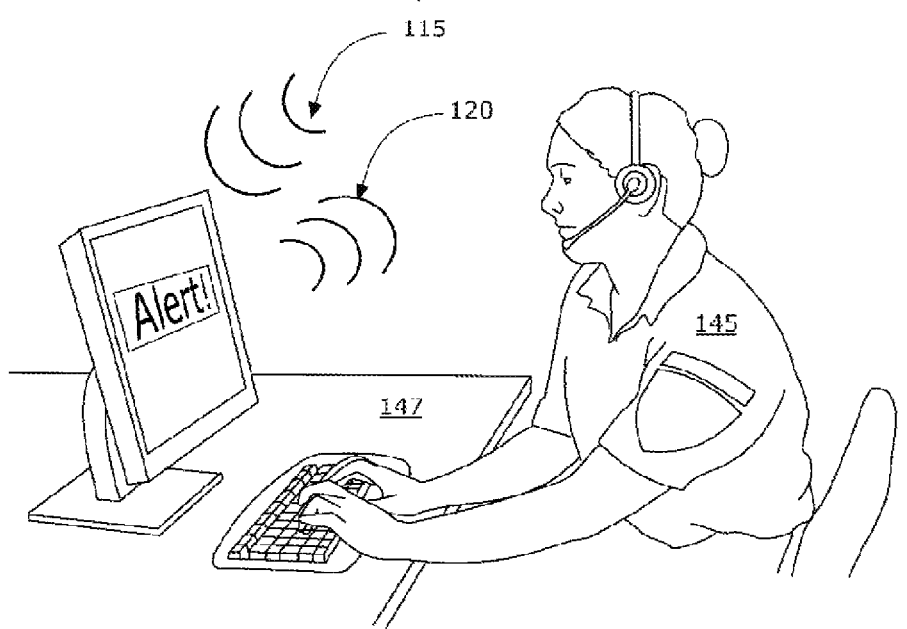
FIG. 1B shows a perspective view illustrating the handheld emergency communications and location information system during an 'in-use' condition showing a remote emergency response personnel receiving and responding to a transmitted emergency signal according to an embodiment of the present invention.

Referring now to FIGS. 1A-1B, FIG. 1A, there is shown handheld emergency communications and location information system 100 during 'in-use' condition 150. User 140 in a potentially life-threatening situation may send communication signal 115 via base unit assembly 102. FIG. 1B shows remote emergency personnel 145 who may receive communication signal 115 and respond via response signal 120 to an emergency.

As further shown in FIGS. 1A-1B, base unit assembly 102 may be carried on a belt of user 140. This may provide a means for user 140 to inconspicuously activate base unit assembly 102 if in a threatening or otherwise distressful situation. As shown, user 140 may activate base unit assembly 102 and communication signal 115 may then be sent to remote emergency provider 147. Remote emergency provider 147 may be a 911 responder or alternatively a member of a private or public security service provider (designated).

Remote emergency provider 147 may be in direct communication with the plurality of emergency and rescue service providers including but not limited to, police, fire department, emergency medical services (EMS), emergency telephone numbers (i.e. 911), search and rescue, mountain rescue, and coastguard. The aforementioned list of service providers may allow for the most appropriate and fastest response time for user's 140 emergency. Remote emergency provider 147 may further provide vital-information such as current medical information, physical needs, photo, generalized description, age, height, weight, and emergency contacts of user 140 to the emergency and rescue service providers.

Figure 2:
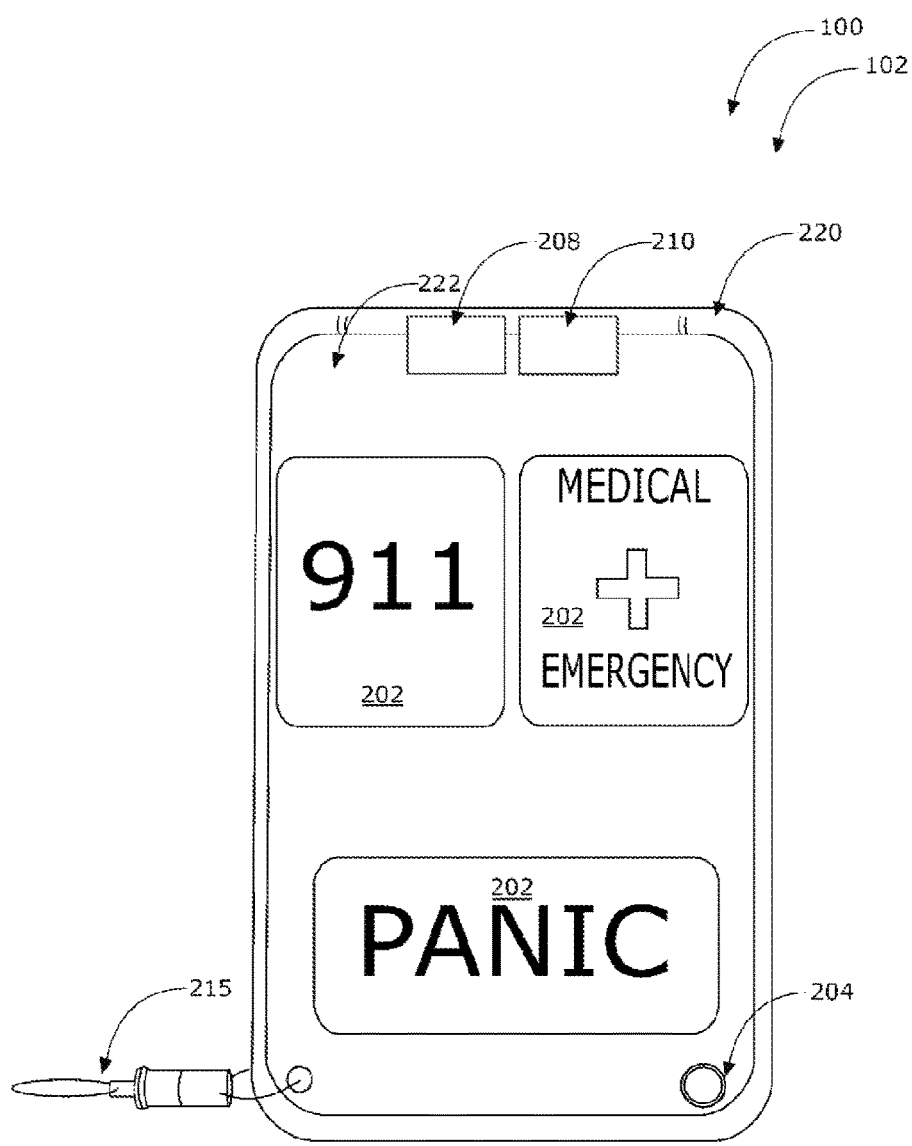
FIG. 2 is a front perspective view illustrating the handheld emergency communications and location information system according to an embodiment of the present invention.
Figure 3:
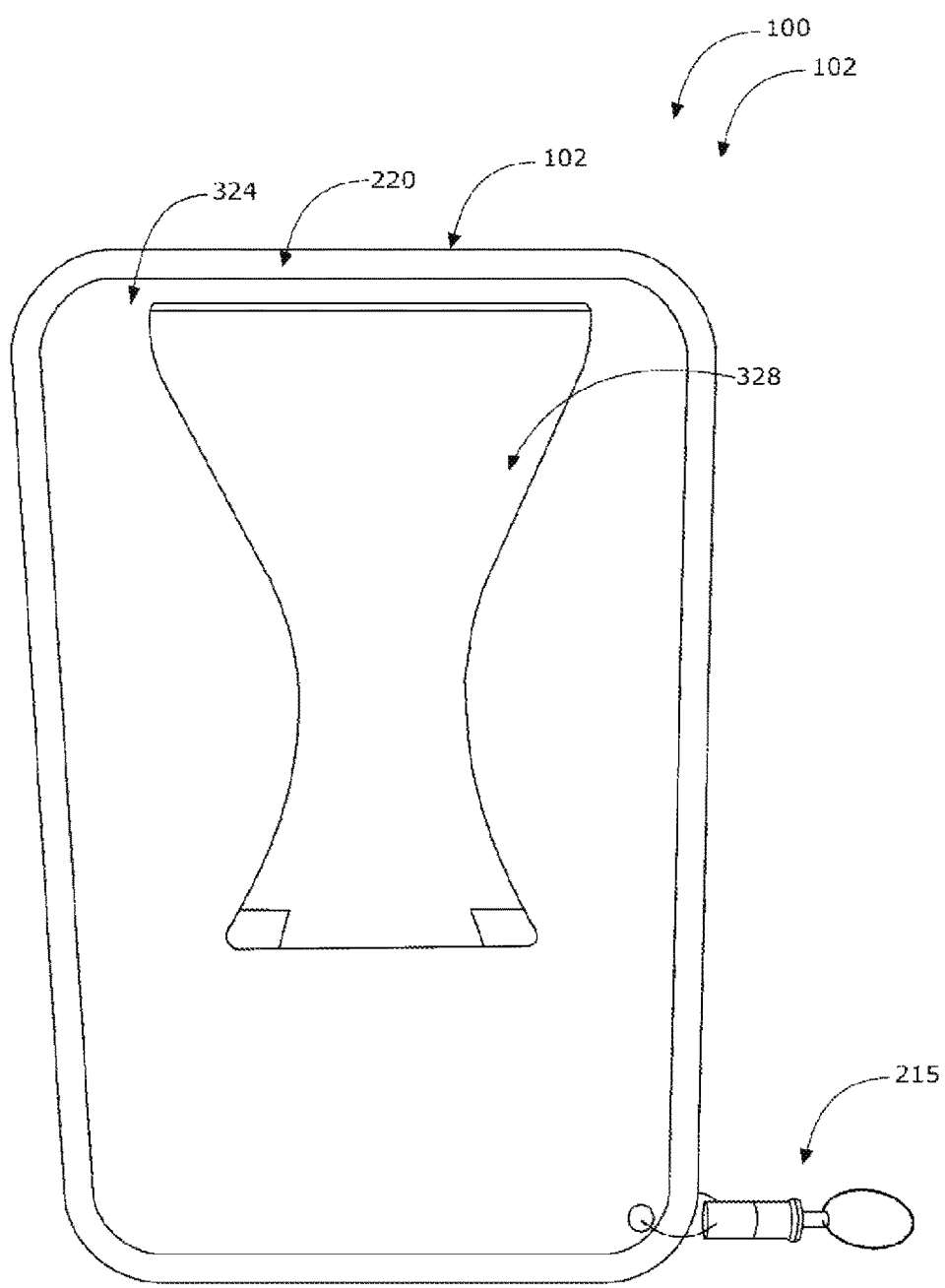
FIG. 3 is a rear perspective view illustrating a self-contained enclosure of the handheld emergency communications and location information system according to an embodiment of the present invention.
Figure 4:
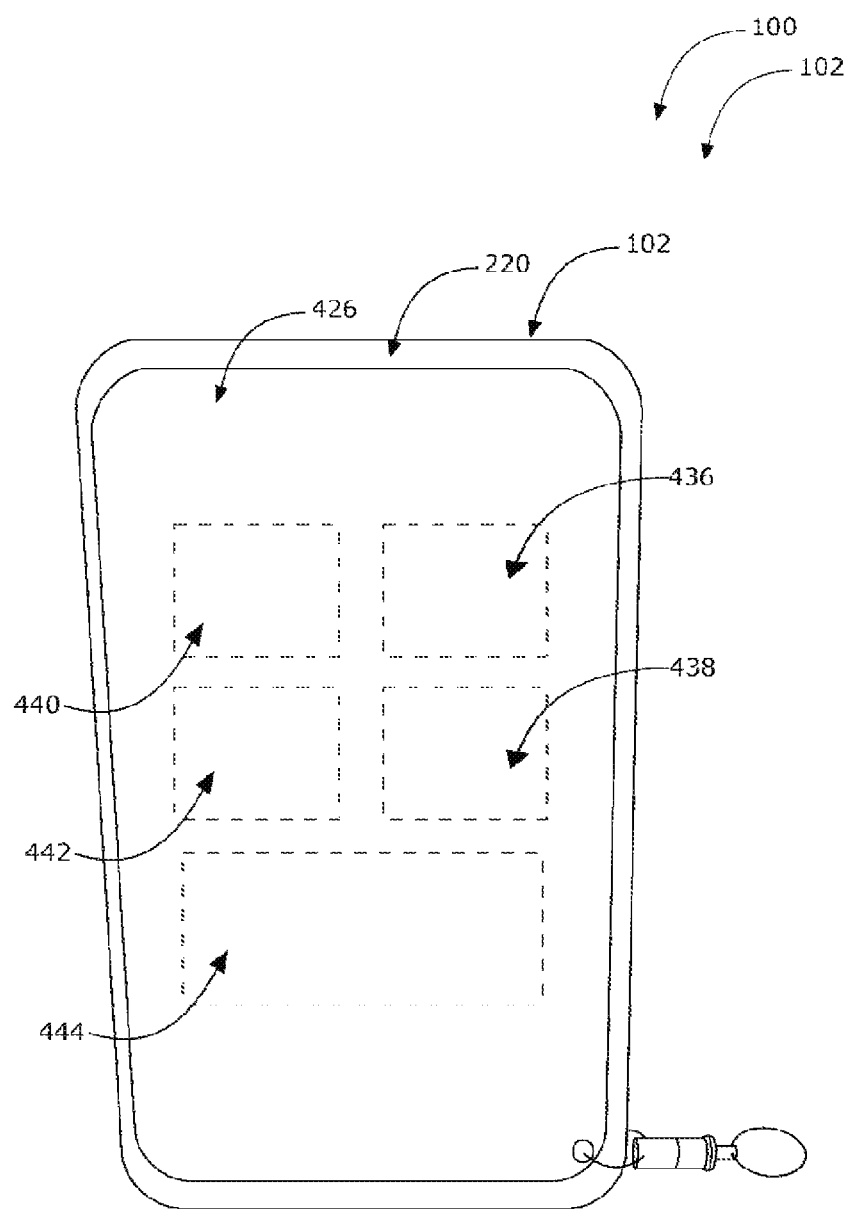
FIG. 4 is a perspective view illustrating components located within an inner volume of the self-contained enclosure of the handheld emergency communications and location information system according to an embodiment of the present invention.

Referring now to FIG. 2, there is shown a front view illustrating handheld emergency communications and location information system 100. Handheld emergency communications and location information system 100 may comprise base unit assembly 102. Self-contained enclosure 220 may embody exterior parameters of base unit assembly 102. Front plate 222 may embody a section of a protective casing of self-contained enclosure 220. Front plate 222, rear plate 324 (as shown in FIG. 3), and inner volume 426 (as shown in FIG. 4) may structurally define parameters of self-contained enclosure 220. Front plate 222 and rear plate 324 (as shown in FIG. 3) of self-contained enclosure 220 may seal off inner volume 426 (as shown in FIG. 4) in order to provide an effectively water-resistant assembly.

As shown in FIG. 2, the plurality of raised emergency signal buttons 202 may be located on a front side of base unit assembly 102. The plurality of raised emergency signal buttons 202 may embody three separate buttons that may be activated by a hand of user 140. As shown, a first-button of the plurality of raised emergency signal buttons 202 may be labeled '911' and may further comprise braille indicating 911 general emergency for visually impaired. Communication signal 115 pertinent to vital-information of user 140 may be communicated once upon application of first, second, and third-buttons of the plurality of raised emergency signal buttons 202. Alternatively, communication signal 115 may be repeatedly relayed until response signal 120 may be received by wireless receiver unit 436 (as shown in FIG. 4). Mobile phone communication signal 115 may be repeatedly communicated upon application of a first and third-button of the plurality of raised emergency signal buttons 202. A GPS location information communication signal 115 may be repeatedly communicated upon application of a first, second, and third-button of the plurality of raised emergency signal buttons 202.

In still referring to FIG. 2, the second-button of the plurality of raised emergency signal buttons 202 may be labeled 'medical emergency' and further labeled with a cross similar to that of a first aid cross symbol. The second-button of the plurality of raised emergency signal buttons 202 may further comprise braille indicating a medical emergency for the visually impaired. As shown, the third-button of the plurality of raised emergency signal buttons 202 may be labeled 'panic' and may further comprise braille indicating panic for the visually impaired. The plurality of raised emergency signal buttons 202 may be located on a plane above front plate 222 of self-contained enclosure 220 such that a visually impaired user 140 and a non-visually impaired user 140 may manipulate raised emergency signal buttons 202 effectively and accurately.

As further shown in FIG. 2, non-emergency control button 204 may be located on front side of base unit assembly 102 and may embody reset/test button. First indicator light 208 may be located on the front side of base unit assembly 102 and may communicate to user 140 via a blinking light or alternatively continual lighting. Second indicator light 210 located on the front side of base unit assembly 102 may communicate to user 140 via intermittent lighting or alternatively constant lighting. The plurality of raised emergency signal buttons 202, the plurality of non-emergency control buttons 204, first indicator light 208, and second indicator light 210 may be fixedly mounted to base unit assembly 102, contiguous to front plate 222 of self-contained enclosure 220.

Further referring to FIG. 2, object-connector 215 may be fixedly located on a front side of base unit assembly 102. Object-connector 215 may embody a quick release key chain clip useful for attaching to a key ring of user 140 for ease of portability. The quick release key chain clip may securely connect to base unit assembly 102 via a key ring penetrating perforation hole in base unit assembly 102, as shown.

Referring now to FIG. 3, there is shown a rear-view illustrating handheld emergency communications and location information system 100. Handheld emergency communications and location information system 100 may comprise base unit assembly 102. Rear plate 324 may embody a rear section of the protective casing of self-contained enclosure 220. Object-connector 215 may be accessible from the rear of base unit assembly 102, as shown. Object-connector may comprise belt clip 328 located on the rear of base unit assembly 102, useful for attaching to the belt of user 140 for ease of portability. Belt clip 328 may be manufactured of flexible material such that user 140 may flex material by hand in order to attach belt clip 328 to the belt of user 140, or elsewhere on user 140.

Referring now to FIG. 4, there is shown a perspective view illustrating handheld emergency communications and location information system 100 which may comprise inner volume 426 of self-contained enclosure 220. As shown, wireless transmitter and receiver unit 436, speaker and alarm unit 438, microcontroller 440, memory unit 442, and power source 444 may be securely mounted within inner volume of self-contained enclosure 220. Self-contained enclosure 220, wireless transmitter and receiver unit 436, speaker and alarm unit 438, microcontroller 440, memory unit 442, power source 444, raised emergency signal buttons 202 (as shown in FIG. 2), non-emergency control buttons 204 (as shown in FIG. 2), first indicator light 208 (as shown in FIG. 2), second indicator light 210 (as shown in FIG. 2), and object-connector 215 (as shown in FIG. 2) may comprise in structural combination base unit assembly 102. The listed components may be arranged and interconnected in a multitude of varying manners in order to provide functional capabilities desired by user 140. Furthermore, other un-named optional components may be provided within inner volume 426 of self-contained enclosure 220.

Wireless transmitter and receiver unit 436 may be useful for wirelessly communicating communication signal 115 to communication device 147 which may be remotely located with respect wireless transmitter and receiver unit. Wireless transmitter and receiver unit 436 may function as component of the GPS location capabilities as well as component of the mobile phone capabilities of the present invention. Speaker and alarm unit 438 may be useful for emitting an audible sound. The audible sound may be initiated when the first or second-button of raised emergency signal button(s) 202 may be activated.

Memory unit 442 may be useful for storing data files and may comprise parameters for operating base unit assembly 102. Memory unit 442 may comprise an SD-card which may store information thereon. Memory unit 442 may further comprise a SIM-card intended to securely store a related key which may be used to identify and authenticate user 140 of the present invention. memory unit 442 may further store vital-information such as personal data pertinent to user 140.

Microcontroller 440 may be in communication with wireless transmitter and receiver unit 436, speaker and alarm unit 438, memory unit 442, the plurality of raised emergency signal buttons 202 (as shown in FIG. 2), the plurality of non-emergency control buttons 204 (as shown in FIG. 2), first indicator light 208 (as shown in FIG. 2), and second indicator light 210 (as shown in FIG. 2). Microcontroller 440 may further comprise a processor core, memory, and programmable input/output peripherals in order to provide process control of functional components of base unit assembly 102.

Power source 444 may provide electrical operating power to wireless transmitter and receiver unit 436, speaker and alarm unit 438, microcontroller 440, memory unit 442, first indicator light 208 (as shown in FIG. 2), and second indicator light 210 (as shown in FIG. 2). power source 444 may further be rechargeable and receive electricity via an external connection/power plug or other suitable means.

Figure 5A:
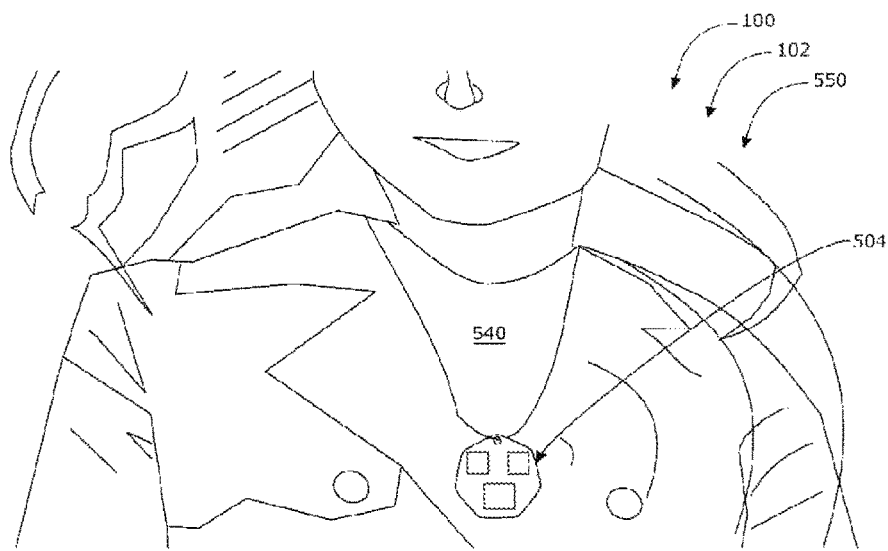
FIG. 5A is a perspective view illustrating the handheld emergency communications and location information system according to an alternate embodiment of the present invention.
Figure 5B:
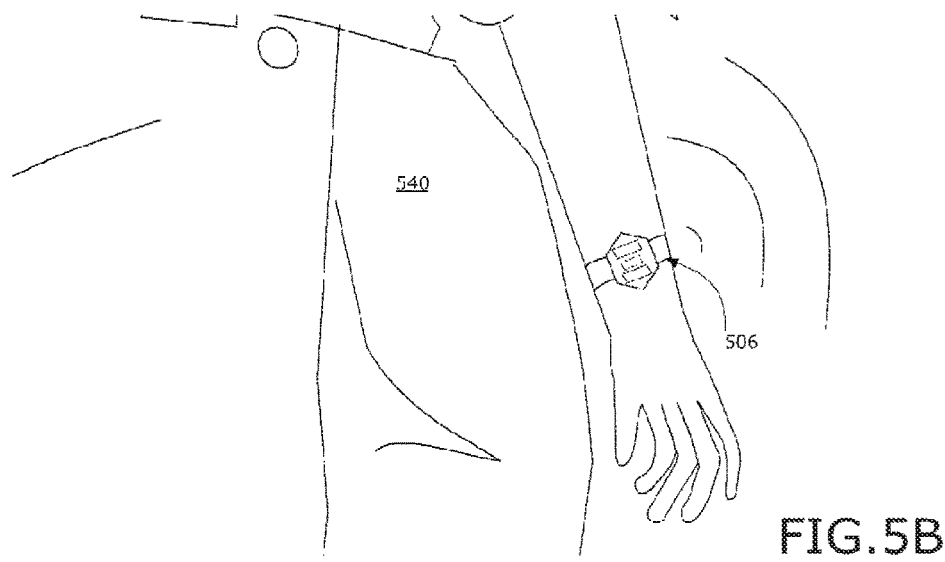
FIG. 5B is a perspective view illustrating the handheld emergency communications and location information system according to another alternate embodiment of the present invention.

Referring now to FIGS. 5A and 5B, illustrating handheld emergency communications and location information system 100 showing alternate embodiments as pendant 504 and watch 506 of base unit assembly 102 during 'in-use' condition 550. As shown in FIG. 5A, user 140 may wear alternate embodiment 504 around neck of user 540. The alternate embodiment 504 may comprise similar components and functionality to that of the preferred embodiment of invention. As shown in FIG. 5A, user 140 may wear alternate embodiment 506 around a wrist of user 540. The alternate embodiment 506 may comprise similar components and functionality to that of the preferred embodiment of invention.

Figure 6:
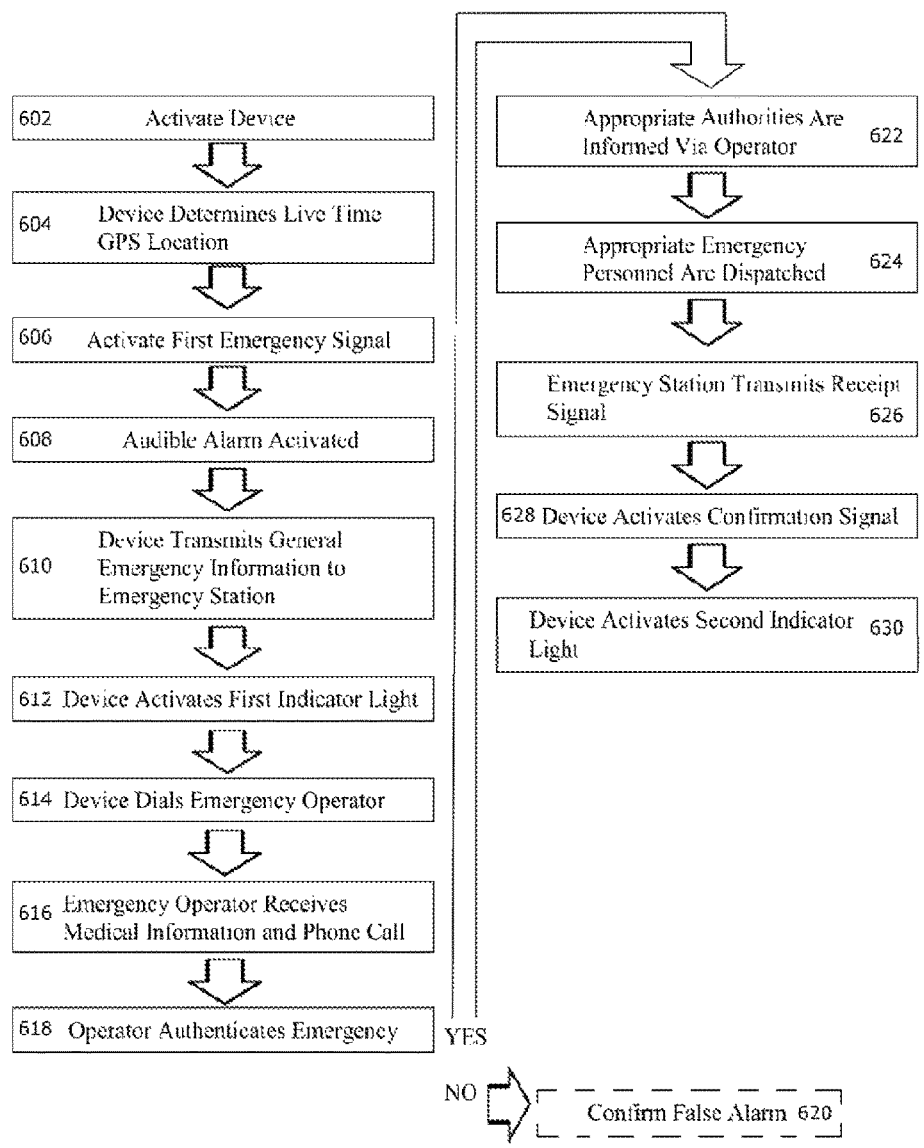
FIG. 6 is a flowchart illustrating the steps performed by the first-button of the plurality of raised emergency signal buttons of the handheld emergency communications and location information system according to an embodiment of the present invention.

Referring now to FIG. 6, there is shown a flowchart illustrating steps performed by the first-button of the plurality of raised emergency signal buttons 600 of handheld emergency communications and location information system 100. As shown, steps performed by the first-button of the plurality of raised emergency signal buttons 600 may comprise the steps of: activate device 602, device determines live time GPS location 604, activate first emergency signal 606, audible alarm activated 608, device transmits general emergency information to emergency station 610, device activates first indicator light 612, device dials emergency operator 614, emergency operator receives medical information and phone call 616, operator authenticates emergency 618, confirm false alarm 620, appropriate authorities may be informed via operator 622, appropriate emergency personnel may be dispatched 624, emergency station transmits receipt signal 626, device activates confirmation signal 628, device activates second indicator light 630. It should be noted that step 620 may be optional step and may not be implemented in all cases. Optional steps performed by first-button of the plurality of raised emergency signal buttons 600 may be illustrated using dotted lines in FIG. 6 so as to distinguish them from other steps of method of use 600.

Figure 7:
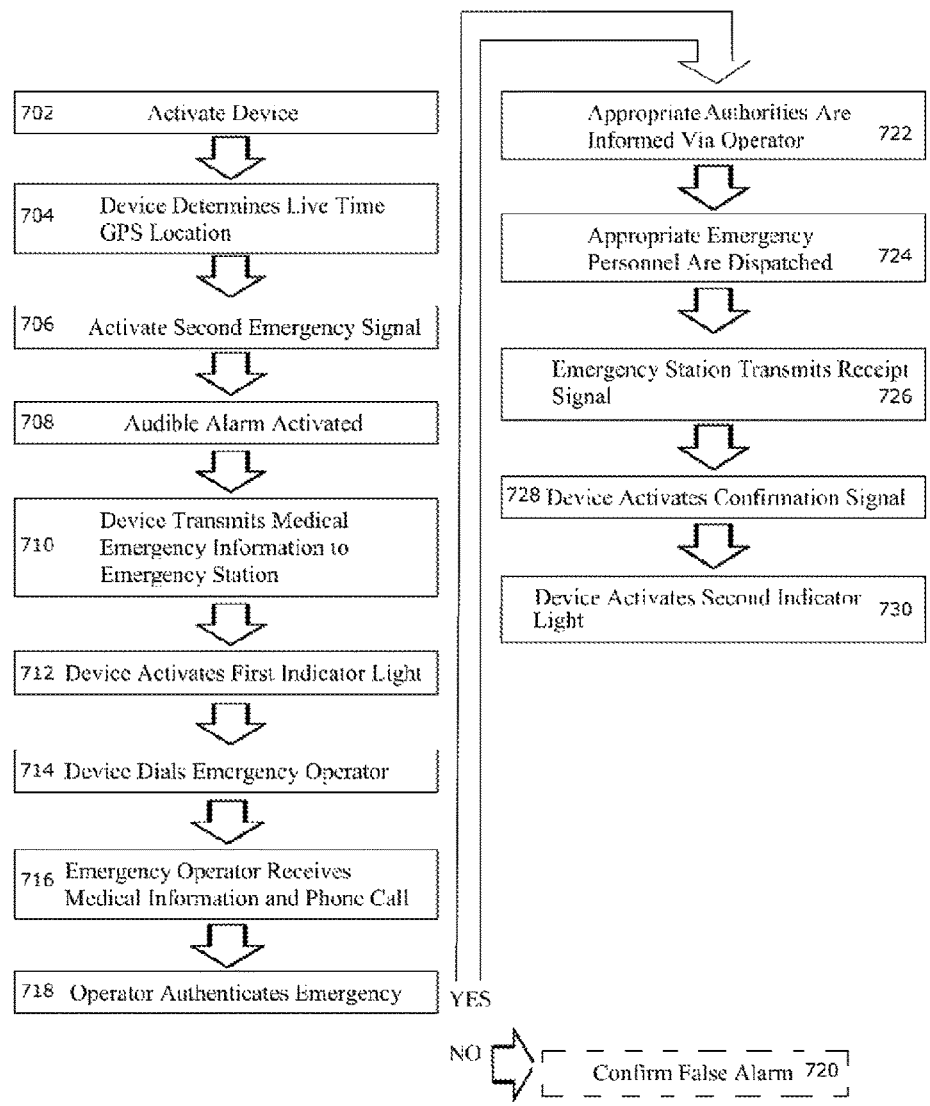
FIG. 7 is a flowchart illustrating the steps performed by a second-button of the plurality of raised emergency signal buttons of the handheld emergency communications and location information system according to an embodiment of the present invention.

Referring now to FIG. 7, there is shown a flowchart illustrating steps performed by second-button of the plurality of raised emergency signal buttons 700 of handheld emergency communications and location information system 100. As shown, steps performed by second-button of the plurality of raised emergency signal buttons 700 may comprise the steps of: activate device 702, device determines live time GPS location 704, activate second emergency signal 706, audible alarm activated 708, device transmits medical emergency information to emergency station 710, device activates first indicator light 712, device dials emergency operator 714, emergency operator receives medical information and phone call 716, operator authenticates emergency 718, confirm false alarm 720, appropriate authorities may be informed via operator 722, appropriate emergency personnel may be dispatched 724, emergency station transmits receipt signal 726, device activates confirmation signal 728, device activates second indicator light 730. It should be noted that step 720 may be optional step and may not be implemented in all cases. Optional steps performed by second-button of the plurality of raised emergency signal buttons 700, may be illustrated using dotted lines in FIG. 7 so as to distinguish them from other steps of method of use 700.

Figure 8:
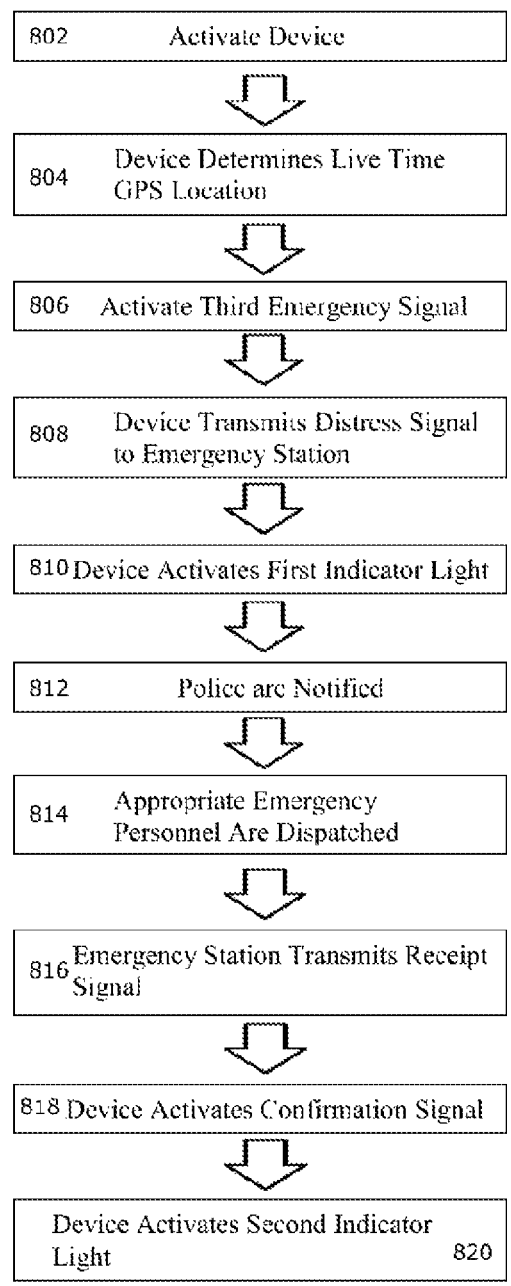
FIG. 8 is a flowchart illustrating the steps performed by a third-button of the plurality of raised emergency signal buttons of the handheld emergency communications and location information system according to an embodiment of the present invention.

Referring now to FIG. 8, there is shown a flowchart illustrating steps performed by third-button of the plurality of raised emergency signal buttons 800 of handheld emergency communications and location information system 100. As shown, steps performed by third-button of the plurality of raised emergency signal buttons 800 may comprise the steps of: activating device 802, device determines live time GPS location 804, activate first emergency signal 806, device transmits distress signal to emergency station 808, device activates first indicator light 810, police may be notified 812, appropriate emergency personnel may be dispatched 814, emergency station transmits receipt signal 816, device activates confirmation signal 818, device activates second indicator light 820.

Figure 9:
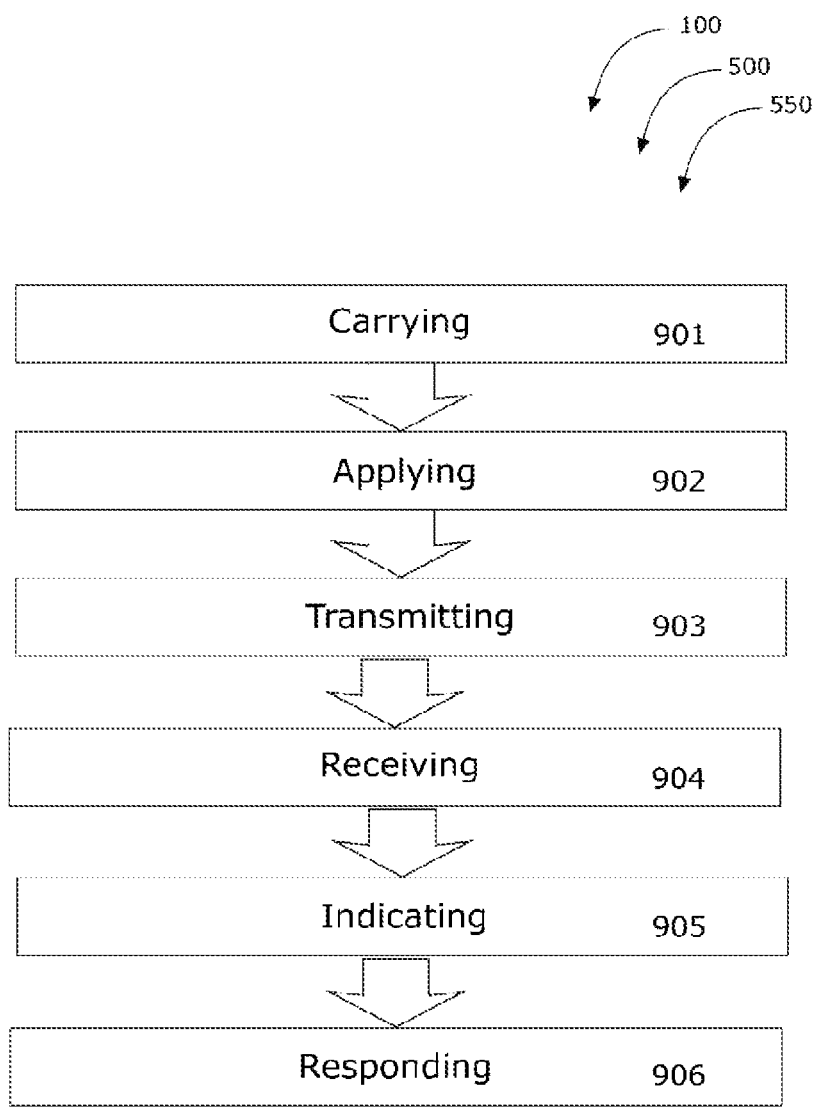
FIG. 9 is a flowchart illustrating a method of use for the handheld emergency communications and location information system according to an embodiment of the present invention.

Referring now to FIG. 9 there is shown flowchart 950 illustrating method of use 900 for handheld emergency communications and location information systems 100 according to an embodiment of the present invention of FIGS. 1A-9. As shown, method of use 900 may comprise the steps of: step one 901, carrying, step two 902, applying, step three 903, transmitting, step four 904, receiving, step five 905, indicating, step six 906, responding.

Figure 10:
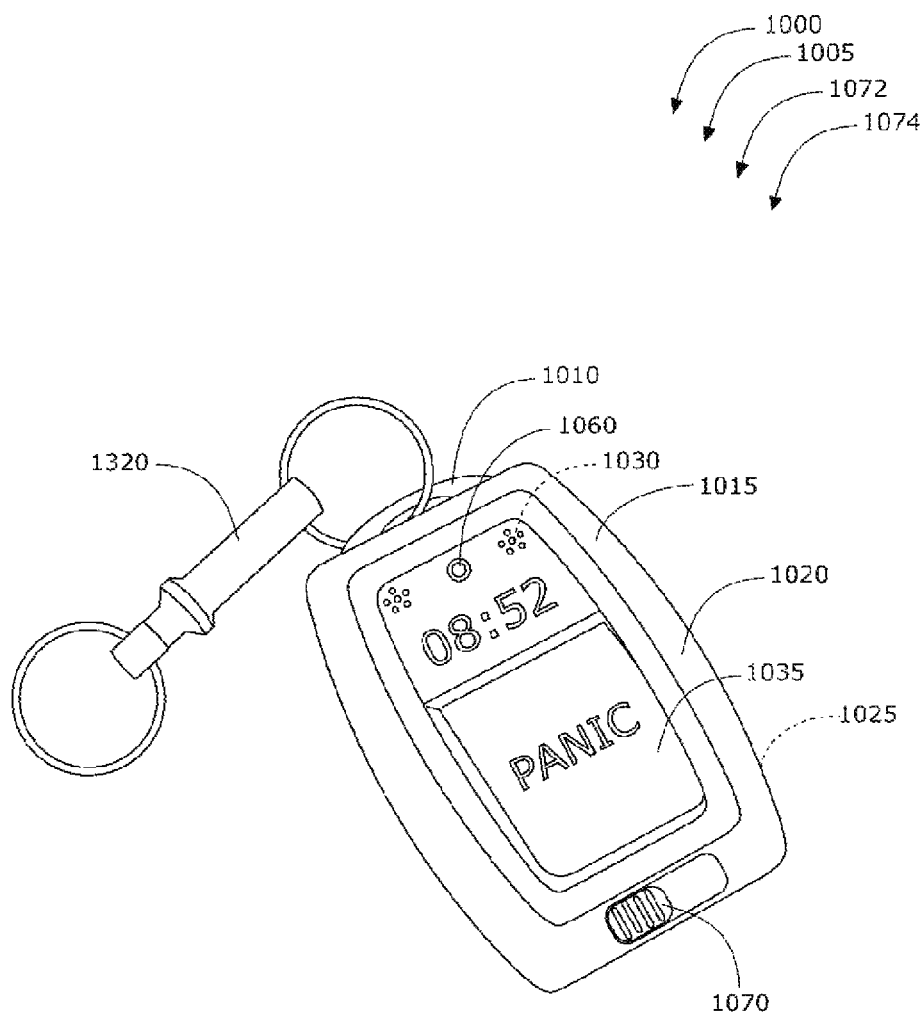
FIG. 10 is a perspective view illustrating the handheld emergency communications and location information system having a single button and a display screen according to an alternative embodiment of the present invention.

Referring now to FIG. 10 showing an alternative embodiment of handheld emergency communications and location information systems 1000 according to the present disclosure. As shown, handheld emergency communications and location information systems 1000 may comprise base unit assembly 1005 which may include: self-contained enclosure 1015 having front plate 1020 and rear plate 1025 coupled together and defining inner volume 1030; at least one wireless transmitter and receiver unit 1110; at least one speaker and alarm unit 1120; digital display screen 1130 mounted to front plate 1020; microcontroller 1140; at least one memory unit 1150; at least one power source 1160; and at least one emergency signal button 1035 mounted to front plate 1020. Further, handheld emergency communications and location information systems 1000 may also comprise attachment adapter 1010 configured to-attach base unit assembly 1005 to a wearable (and alternatively a non-wearable) article.

In continuing to refer to FIG. 10, it should be noted that self-contained enclosure 1015, at least one wireless transmitter and receiver unit 1110, at least one speaker and alarm unit 1120, digital display screen 1130, microcontroller 1140, at least one memory unit 1150, at least one power source 1160, and at least one emergency signal button 1035 comprises in structural combination base unit assembly 1005. Further, at least one wireless transmitter and receiver unit 1110, at least one speaker and alarm unit 1120, digital display screen 1130, microcontroller 1140, at least one memory unit 1150, and at least one power source 1160 are securely mounted within said inner volume of self-contained enclosure 1015.

In continuing to refer to FIG. 10, digital display screen 1130 is shown mounted to front plate 1020 of self contained enclosure 1015 and is configured to display data and information. In one embodiment, digital display screen 1130 may display time (as kept by clock 1180), messages from third party personnel, vital sign information (as detected by at least one physiological sensor 1210), and other information.

In continuing to refer to FIG. 10, base unit assembly 1005 is shown comprising a switch 1070. Switch 1070 may be configured to toggle between an inconspicuous mode 1072 and a conspicuous mode 1074. In other embodiments, switch 1070 may comprise a button structured to be pressed and depressed by user 140.

Figure 11:
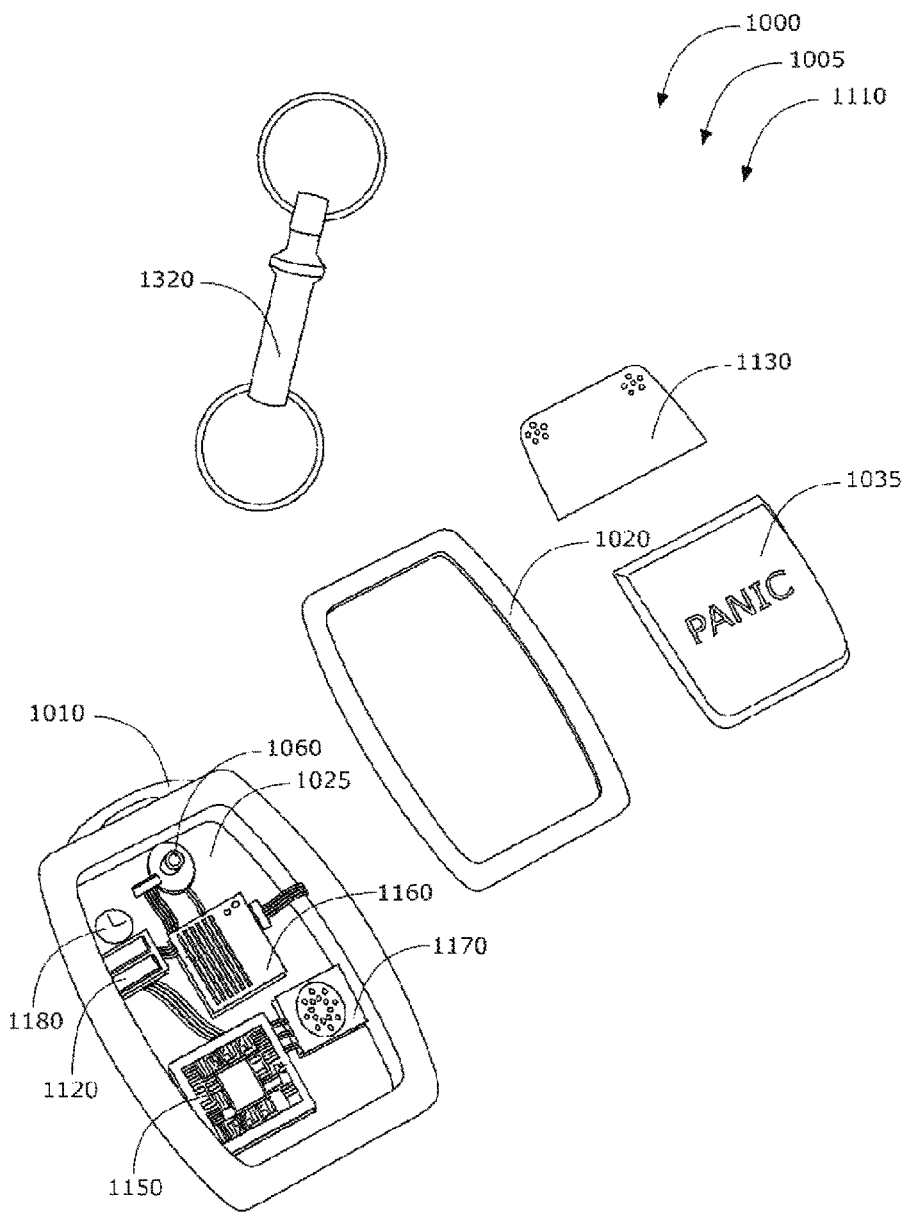
FIG. 11 is an exploded view illustrating the handheld emergency communications and location information system according to the alternative embodiment of the present invention of FIG. 10.
Figure 12:
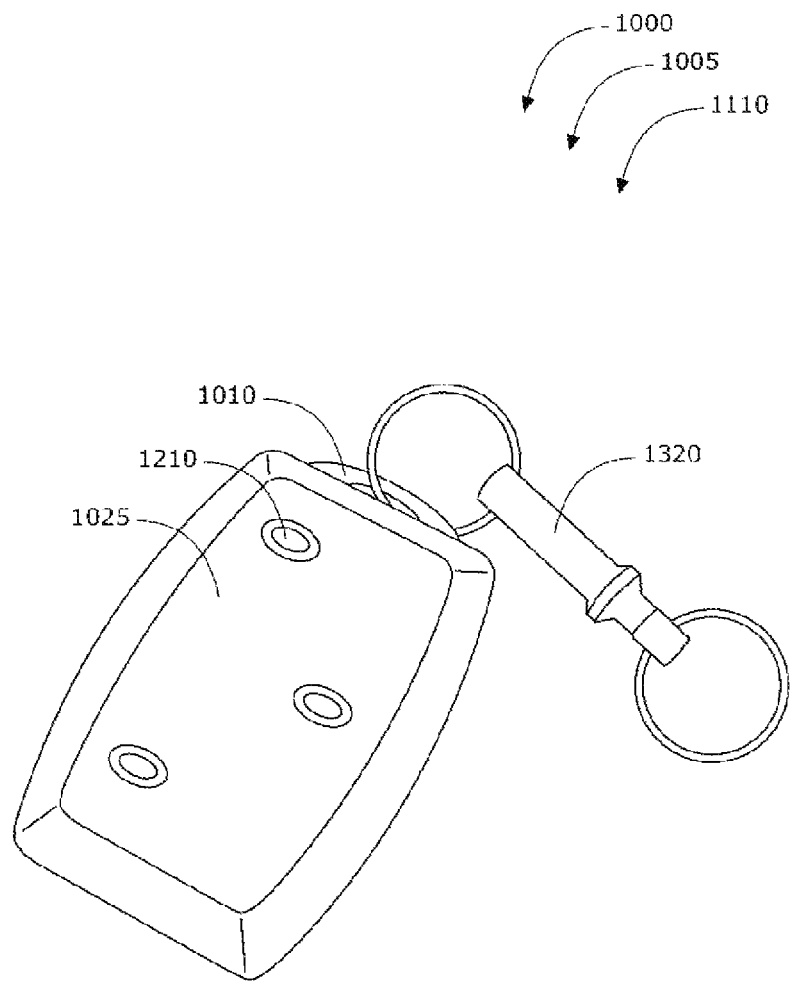
FIG. 12 is a perspective view illustrating a back plate of a self-contained enclosure of the handheld emergency communications and location information system comprising a plurality of physiological sensors according to an alternative embodiment of the present invention of FIGS. 10 and 11.

Referring now to FIG. 11 showing an exploded view of handheld emergency communications and location information systems 1000 according to an embodiment of the present invention of FIG. 10. As shown, microcontroller 1140 may be in communication with at least one wireless transmitter and receiver unit 1110, at least one speaker and alarm unit 1120, digital display screen 1130, at least one memory unit 1150, at least one power source 1160, and at least one emergency signal button 1035. As may be appreciated, at least one power source 1160 serves to provide operating power to base unit assembly 1005. In one embodiment, at least one power source 1160 may comprise at least one battery. Other power sources 1160 may include, but are not limited to, a single battery, at least one rechargeable battery, photovoltaic cells, and the like.

In continuing to refer to FIG. 11, at least one wireless transmitter and receiver unit 1110 may be configured to transmit a wireless signal when at least one emergency signal button 1035 is pressed. Preferably, the wireless signal is transmitted to at least one other communication device which is remotely located with respect to at least one wireless transmitter and receiver unit 1110. It should be noted that at least one other communication device may comprise a Smartphone, a tablet, a computer, or any communication device configured to receive a wireless signal. Further, it should be noted that the wireless signal transmitted by at least one wireless transmitter and receiver unit 1110 may be encoded. In such a manner, base unit assembly 1005 of handheld emergency communications and location information systems 1000 may be uniquely coded to user 140. In addition, the wireless signal may be free of interference during transmission.

In still referring to FIG. 11, at least one speaker and alarm unit 1120 may be configured to emit at least one audible sound. For example, at least one speaker and alarm unit 1120 may emit a sound when at least one emergency signal button 1035 is pressed by user 140. In another example, at least one speaker and alarm unit 1120 may emit a sound when a return signal is received by at least one wireless transmitter and receiver unit 1110. In yet another example, at least one speaker and alarm unit 1120 may emit a sound when handheld emergency communications and location information systems 1000 is powered on and off, when handheld emergency communications and location information systems 1000 is low on power. Further, at least one speaker and alarm unit 1120 may be configured to emit a loud alarm sound when at least one emergency signal button 1035 is pressed and held by user 140.

In still referring to FIG. 11, at least one memory unit 1050 is useful for storing at least one data file comprising parameters for operating base unit assembly 1005. Microcontroller 1140 may function in combination with at least one wireless transmitter and receiver unit 1110 to receive and track coordinates of a relative location of base unit assembly 1005. Further, microcontroller 1140 may be configured to transmit the coordinates to the at least one other communication device controlled by the at least one third party via at least one wireless transmitter and receiver unit 1110 when at least one emergency signal button 1035 is pressed by user 140. In such a manner, handheld emergency communications and location information system 1000 is configured, and is useful, for allowing user 140 to transmit a real-time emergency signal to at least one third party in position to respond to an emergency of user 140 in an expedient manner.

In one embodiment as shown in FIG. 11, base unit assembly 1005 may comprise vibrating mechanism 1170 fixedly mounted within inner volume 1030 of self-contained enclosure 1015.

Referring to FIGS. 10 and 11, it should be noted that inconspicuous mode 1072, when activated by the switch 1070, is configured to activate vibrating mechanism 1170, and deactivate at least one speaker and alarm unit 1120 and deactivate digital display screen 1130. In such a manner, base unit assembly 1005 will not emit any sounds or lights such as to give any aural or visual indication to an assailant when user 140 may be under duress. Further, while in inconspicuous mode 1072, vibrating mechanism 1170 may be configured to pulsate a first time when the real-time emergency signal is successfully transmitted by at least one wireless transmitter and receiver unit 1110 and a second time when real-time emergency signal is successfully received by at least one other communication device. In such a manner, user 140 may receive an indication of successful transmission of the real-time emergency signal discretely and without detection to an assailant when user 140 may be under duress. Yet still, vibrating mechanism 1170 may be configured to pulsate when a second-return-signal is received by at least one wireless transmitter and receiver unit 1110. In such a manner, user 140 may receive an indication of receipt of a second signal from a third party in receipt of the real-time emergency signal discretely and without detection to an assailant when user 140 may be under duress.

Referring to FIGS. 10 and 11, it should be noted that conspicuous mode 1074, when activated by the switch 1070 or button, activates features such as digital display screen 1130, at least one speaker and alarm unit 1120, and camera 1060. When in conspicuous mode 1074, digital display screen 1130 may be configured to display at least one color. It should be noted that at least one color comprises a first color useful for indicating a successful transmission of the real-time emergency signal to said at least one other communication device. Further, at least one color comprises a second color useful for indicating when a return signal is received by the at least one wireless transmitter and receiver unit from at least one other communication device. In addition, digital display screen 1130 may be configured to display at least one message related to a status of emergency assistance. It should be noted that at least one third-party may initiate a response to user 140 (for example, a text message sound, a vibration or pulsation, or other visual indication via digital display screen 1130). Incoming transmissions may trigger any or all the above user indicator means to indicate to user 140 how many minutes until help arrives via the number of stimuli received (for example five minutes would be five vibrations).

Further, digital display screen 1130 may be configured to display a time as kept by clock 1180, which may be securely mounted within self contained enclosure 1015. It should be noted that the time as kept by clock 1180 may be configured to alternate or change colors to provide subtle visual indication to user 140 that assistance may be on the way. Yet still, digital display screen 1130 may be configured to show a numeric countdown in big numbers when help is on the way. As improvements in GPS locator technology develops, it should be appreciated that the digital display time for ETA of help may become roughly calculable by the second to provide user 140 with as close to 'real-time' help arrival clock.

In continuing to refer to FIGS. 10 and 11, it should be noted that in one embodiment of the present invention base unit assembly 1005 may comprise camera 1060. Camera 1060 may be configured to capture at least one digital image when at least one emergency signal button 1035 is pressed by user 140. Further, the at least one digital image may be wirelessly transmitted to the at least one other communication device when at least one emergency signal button 1035 is pressed by user 140. In such a manner, user 140 may be able to capture a digital image of an assailant when in distress and communicate the digital image immediately to the third party. This may serve to prevent or deter an attack when the assailant is aware that his or her likeness has been captured and sent to emergency personnel. Further, base unit assembly 1005 may comprise a flash. The flash may be useful in combination with camera 1060 in low ambient environments (such as in a parking garage or at night).

Figure 13A:
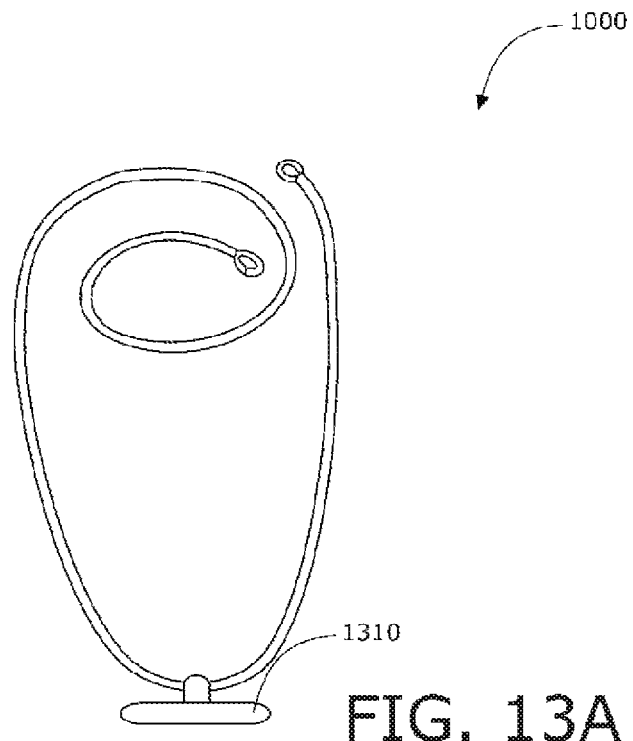
FIG. 13A is a perspective view of an attachment adapter of the handheld emergency communications and location information system comprising an accessory bar according to an embodiment of the present invention.

Referring now to FIG. 13A showing attachment adapter 1010 of handheld emergency communications and location information systems 1000 according to an embodiment of the present invention. As shown, attachment adapter 1010 may comprise accessory bar 1310 and alternatively quick release fastener clip 1320. It should be appreciated that accessory bar 1310 and quick release fastener clip 1320 may be configured to attach to a necklace, a cord, or the like, as shown.

Figure 13B:
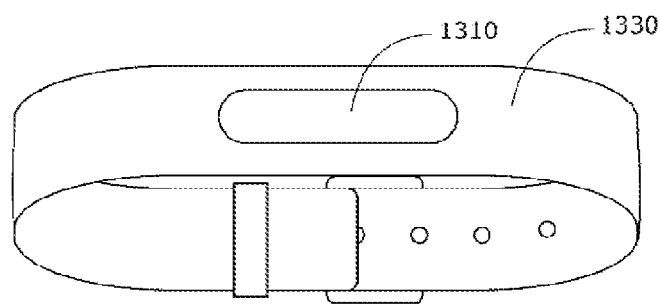
FIG. 13B is a perspective view of the attachment adapter of the handheld emergency communications and location information system comprising a magnetic band according to an embodiment of the present invention.

Referring now to FIG. 13B showing attachment adapter 1010 of handheld emergency communications and location information systems 1000 according to an embodiment of the present invention. As shown, attachment adapter 1010 may comprise magnetic band 1330. It should be appreciated that magnetic band 1330 may be configured to magnetically couple base unit assembly 1005 to a wearable article or non-wearable article having a ferrous component.

In one embodiment of the present disclosure, handheld emergency communications and location information system 1000 may comprise self-contained enclosure 1015 having front plate 1020 and rear plate 1025 coupled together and defining inner volume 1030; at least one wireless transmitter and receiver unit 1110; at least one speaker and alarm unit 1120; digital display screen 1130 mounted to front plate 1020; microcontroller 1140; at least one memory unit 1150; at least one power source 1160; vibrating mechanism 1170; clock 1180; camera 1060; at least one switch 1070 for toggling between inconspicuous mode 1072 and conspicuous mode 1074; and at least one emergency signal button 1035 mounted to front plate 1020. Handheld emergency communications and location information systems 1000 may also comprise attachment adapter 1010 configured to removably-attach base unit assembly 1005 to a wearable (and alternatively a non-wearable) article.

Further, handheld emergency communications and location information systems 1000 may comprise at least one physiological sensor 1210 mounted to rear plate 1025 of self-contained enclosure 1015, at least one physiological sensor 1210 configured to detect at least one physiological sign of user 140 when at least one physiological sensor 1210 is in touch contact with a skin surface of user 140. It should be appreciated that at least one physiological sensor 1210 may be configured to detect physiological signs of user 140 such as heart rate, body temperature, pulse, respiratory rate, and the like. Further, microcontroller 1140 may be configured to activate at least one wireless transmitter and receiver unit 1110 to transmit emergency signal to third party when at least one physiological sensor detects an escalated heart rate or other medical emergency condition of user 140.

In yet another embodiment, at least one emergency signal button 1035 may be configured to cause at least one wireless transmitter and receiver unit 1110 to transmit encoded messages/signals to at least one third-party (for example, emergency personnel, private security dispatch companies, national 911 service, family member or emergency contact) using a sequence of pressing/tapping on at least one emergency signal button 1035 to signal specific emergencies.

Example: where user 140 presses once—sends encoded messages for accident/police; Press twice—sends encoded message for medical emergency; Press three times and at least one wireless transmitter and receiver unit 1110 may transmit an encoded signal that user 140 is under immediate duress is an ambush/assault emergency at which critical time where no verbal communication may be possible.

In some embodiments of the present invention, each base unit assembly 1005 may be registered. Registration may include a step of creating a user account for identifying user 140. A second step may include adding emergency contact information related to user 140. Further, the user account may include a billing profile for billing user 140 for a service.

Figure 14:
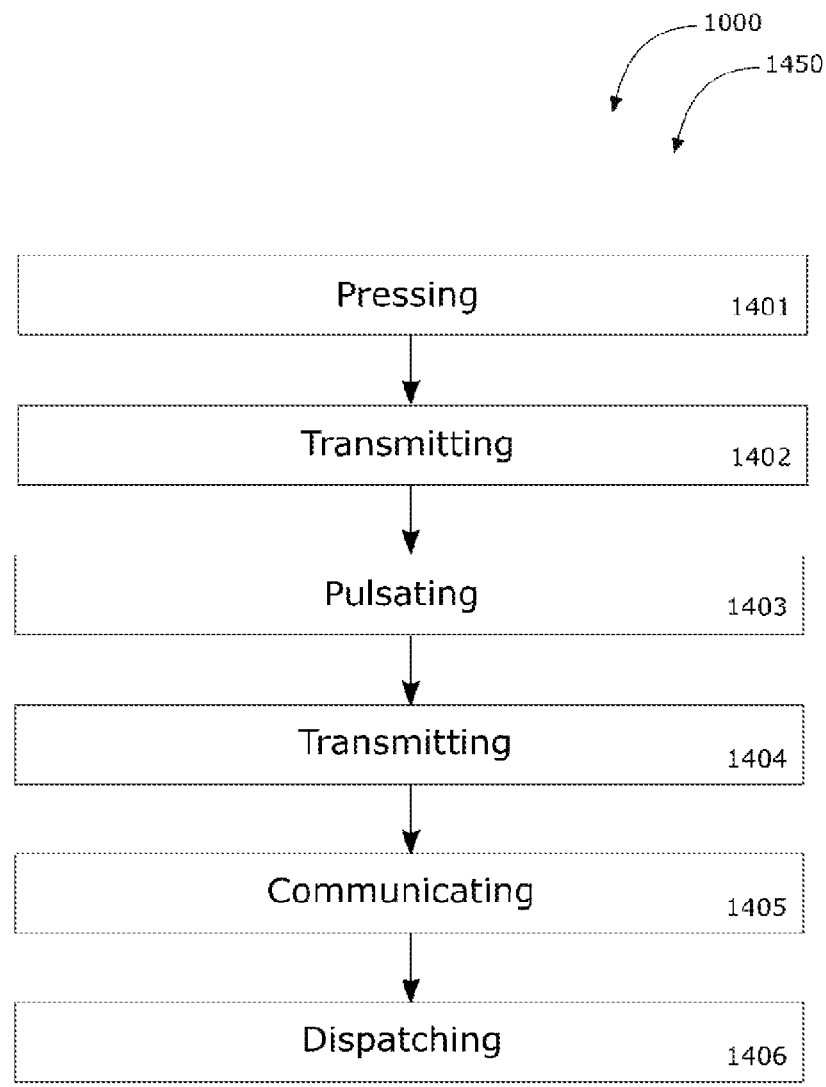
FIG. 14 is a flowchart showing a method of secretly signaling for help when a user is in distress using the handheld emergency communications and location information system according to an embodiment of the present invention of FIGS. 10-12.

Referring now to FIG. 14 showing a flowchart 1450 showing a method of use 1400 of secretly signaling for help when user 140 is in distress using a handheld emergency communications and location information system 100, 1000 comprising the steps of: step one 1401, pressing at least one emergency signal button 1035 mounted to front plate 1020 of self-contained enclosure 1015 of base unit assembly 1005; step two 1402, transmitting a real-time emergency signal via at least one wireless transmitter and receiver unit 1110 to at least one third party in position to respond to an emergency situation of user 140 in distress; step three 1403, pulsating self-contained enclosure 1015 via vibrating mechanism 1170 to inconspicuously indicate to user 140 successful transmission and receipt of the real-time emergency signal; step four 1404, transmitting a location of user 140 to at least one third party; step five 1405, communicating the location of user 140 to a police agency by the at least one third party; and step six 1406, dispatching help to the location of user 140 in distress in an expedient manner for urgent assistance.

It should be noted that the steps described in the method of use can be carried out in many different orders according to user preference. The use of "step of" should not be interpreted as "step for", in the claims herein and is not intended to invoke the provisions of 35 U.S.C. § 112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A handheld emergency communications and location information system comprising:
   a base unit assembly including;
      a self-contained enclosure having a front plate and a rear plate coupled together and defining an inner volume;
      at least one wireless transmitter and receiver unit;
      at least one speaker and alarm unit;
      a digital display screen mounted to said front plate;
      a microcontroller;
      at least one memory unit;
      at least one power source; and
      at least one emergency signal button mounted to said front plate; and
   an attachment adapter configured to removably-attach said base unit assembly to a wearable article;
   wherein said self-contained enclosure, said at least one wireless transmitter and receiver unit, said at least one speaker and alarm unit, said digital display screen, said microcontroller, said at least one memory unit, said at least one power source, and said at least one emergency signal button comprises in structural combination said base unit assembly;
   wherein said at least one wireless transmitter and receiver unit, said at least one speaker and alarm unit, said digital display screen, said microcontroller, said at least one memory unit, and said at least one power source are securely mounted within said inner volume of said self-contained enclosure;
   wherein said microcontroller is in communication with said at least one wireless transmitter and receiver unit, said at least one speaker and alarm unit, said digital display screen, said at least one memory unit, and said at least one emergency signal button;
   wherein said at least one power source provides operating power to said base unit assembly;
   wherein said at least one wireless transmitter and receiver unit is configured to transmit a wireless signal when said at least one emergency signal button is pressed, said wireless signal transmitted to at least one other communication device remotely located with respect to said at least one wireless transmitter and receiver unit;
   wherein said at least one speaker and alarm unit is configured to emit an audible sound;
   wherein said digital display screen is configured to display data and information;

wherein said at least one memory unit is useful for storing at least one data file comprising parameters for operating said base unit assembly;
wherein said handheld emergency communications and location information system is useful for allowing a user to transmit a real-time emergency signal to at least one third party in position to respond to an emergency situation of said user in an expedient manner;
wherein said microcontroller functions in combination with said at least one wireless transmitter and receiver unit to receive and track coordinates of a relative location of said base unit assembly;
wherein said microcontroller is configured to transmit said coordinates to said at least one other communication device controlled by said at least one third party via said at least one wireless transmitter and receiver unit when said at least one emergency signal button is pressed by said user;
wherein said microcontroller is configured to transmit said coordinates to said at least one other communication device controlled by a different said at least one third party via said at least one wireless transmitter and receiver unit when said at least one emergency signal button is tapped in a sequence and alternatively held for predetermined period of time by said user;
wherein said base unit assembly further comprises a button and alternatively a switch configured to toggle between a conspicuous mode and an inconspicuous mode;
wherein said inconspicuous mode, when activated by said button and alternatively said switch by said user, is configured to activate said vibrating mechanism, and deactivate said at least one speaker and alarm unit and deactivate said digital display screen; and
wherein said vibrating mechanism is configured to pulsate when said real-time emergency signal is successfully transmitted by said at least one wireless transmitter and receiver unit and when subsequent return signals are received said at least one other communication device.

2. The handheld emergency communications and location information system of claim 1 wherein said digital display screen is configured to display in multiple colors and flashing lights useful for indicating information to said user.

3. The handheld emergency communications and location information system of claim 2 wherein said at least one color comprises a first color useful for indicating a successful transmission of said real-time emergency signal to said at least one other communication device when in said conspicuous mode.

4. The handheld emergency communications and location information system of claim 3 wherein said at least one color comprises a second color useful for indicating when a return signal is received by said at least one wireless transmitter and receiver unit from said at least one other communication device when in said conspicuous mode.

5. The handheld emergency communications and location information system of claim 4 wherein said digital display screen is configured to display at least one message related to a status of emergency assistance.

6. The handheld emergency communications and location information system of claim 5 wherein said digital display screen is configured to display a digital timer indicating an approximate estimated time of arrival of emergency assistance.

7. The handheld emergency communications and location information system of claim 1 wherein said base unit assembly further comprises a clock, and a time as kept by said clock is selectively displayable on said digital display screen.

8. The handheld emergency communications and location information system of claim 1 wherein said base unit assembly further comprises a camera.

9. The handheld emergency communications and location information system of claim 1 wherein said attachment adapter comprises an accessory bar and alternatively a quick release fastener clip, said accessory bar and said quick release fastener clip configured to attach to a necklace and alternatively a cord.

10. The handheld emergency communications and location information system of claim 1 wherein said attachment adapter comprises a magnetic band configured to magnetically couple said base unit assembly to said wearable article having a ferrous component.

11. The handheld emergency communications and location information system of claim 1 further comprising at least one physiological sensor mounted to said rear plate of said self-contained enclosure, said at least one physiological sensor configured to detect at least one physiological sign of said user when said at least one physiological sensor is in touch contact with a skin surface of said user.

12. A handheld emergency communications and location information system comprising:
  a base unit assembly including;
    a self-contained enclosure having a front plate and a rear plate coupled together and defining an inner volume;
    at least one wireless transmitter and receiver unit;
    at least one speaker and alarm unit;
    a vibrating mechanism;
    a camera;
    a clock;
    a digital display screen mounted to said front plate;
    a microcontroller;
    at least one memory unit;
    at least one power source; and
    at least one emergency signal button mounted to said front plate; and
  an attachment adapter configured to removably-attach said base unit assembly to a wearable article;
  wherein said at least one wireless transmitter and receiver unit, said at least one speaker and alarm unit, said vibrating mechanism, said camera, said clock, said digital display screen, said microcontroller, said at least one memory unit, and said at least one power source are securely mounted within said inner volume of said self-contained enclosure;
  wherein said microcontroller is in communication with said at least one wireless transmitter and receiver unit, said at least one speaker and alarm unit, said vibrating mechanism, said camera, said clock, said digital display screen, said at least one memory unit, and said at least one emergency signal button;
  wherein said at least one power source provides operating power to said base unit assembly;
  wherein said at least one wireless transmitter and receiver unit is configured to transmit a wireless signal when said at least one emergency signal button is pressed, said wireless signal transmitted to at least one other communication device remotely located with respect to said at least one wireless transmitter and receiver unit;
  wherein said at least one speaker and alarm unit is configured to emit at least one audible sound;

wherein said digital display screen is configured to time, display data, and information;

wherein said at least one memory unit is useful for storing at least one data file comprising parameters for operating said base unit assembly;

wherein said microcontroller functions in combination with said at least one wireless transmitter and receiver unit to receive and track coordinates of a relative location of said base unit assembly;

wherein said microcontroller is configured to transmit said coordinates to said at least one other communication device controlled by said at least one third party via said at least one wireless transmitter and receiver unit when said at least one emergency signal button is pressed by said user;

wherein said base unit assembly further comprises a button and alternatively a switch configured to toggle between a conspicuous mode and an inconspicuous mode;

wherein said camera is configured to capture at least one digital image when said at least one emergency signal button is pressed by said user;

wherein said vibrating mechanism is configured to pulsate when said real-time emergency signal is successfully transmitted by said at least one wireless transmitter and receiver unit and when subsequent return signals are received said at least one other communication device;

wherein said at least one digital image is wirelessly transmitted to said at least one other communication device when said at least one emergency signal button is pressed by said user; and wherein said handheld emergency communications and location information system is useful for allowing a user to transmit a real-time emergency signal to at least one third party in position to respond to an emergency situation of said user in an expedient manner.

13. A method of secretly signaling for help when a user is in distress using the handheld emergency communications and location information system of claim 1 comprising the steps of:

pressing at least one emergency signal button mounted to a front plate of a self-contained enclosure of a base unit assembly;

transmitting a real-time emergency signal via at least one wireless transmitter and receiver unit to at least one third party in position to respond to an emergency situation of said user in distress;

pulsating said self-contained enclosure via a vibrating mechanism to inconspicuously indicate to said user successful transmission and receipt of said real-time emergency signal;

transmitting a location of said user to said at least one third party;

communicating said location of said user to a police agency by said at least one third party; and dispatching help to said location of said user in distress in an expedient manner for urgent assistance.

\* \* \* \* \*